July 30, 1935.   F. H. C. COPPUS   2,009,577
FEED WATER HEATING SYSTEM
Filed Dec. 11, 1930   4 Sheets-Sheet 1
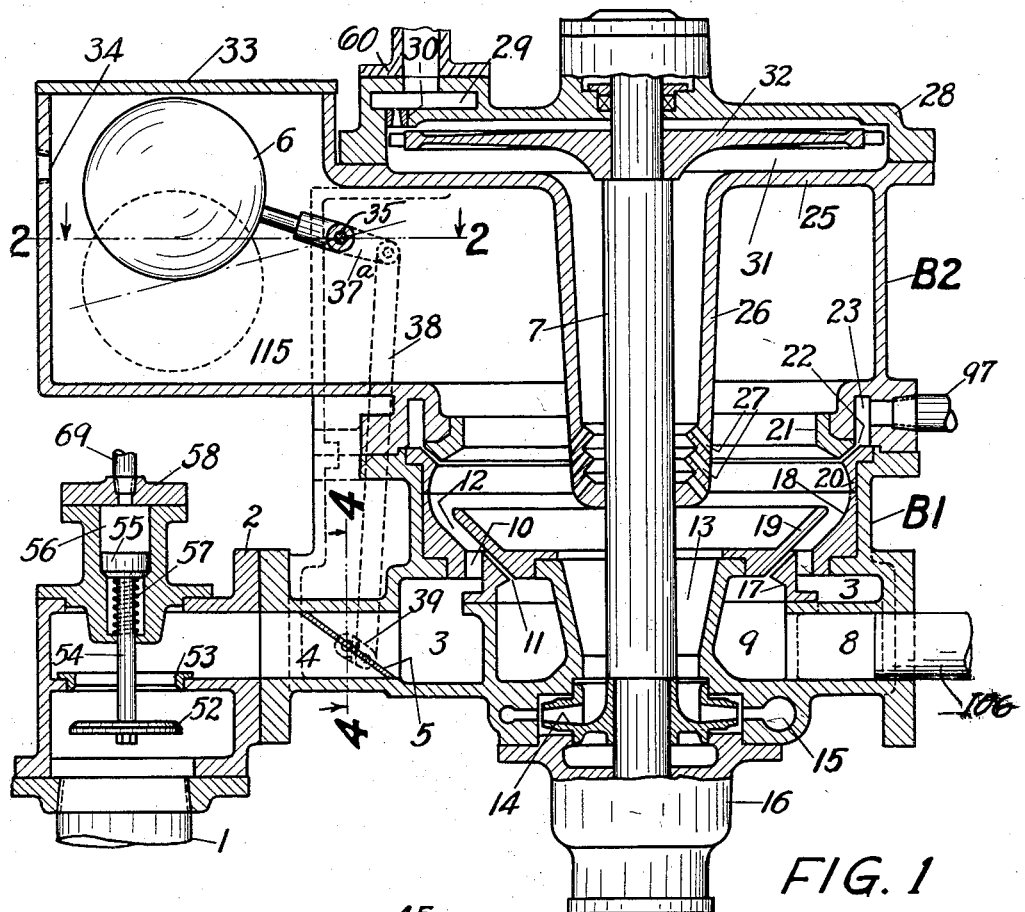
FIG. 1
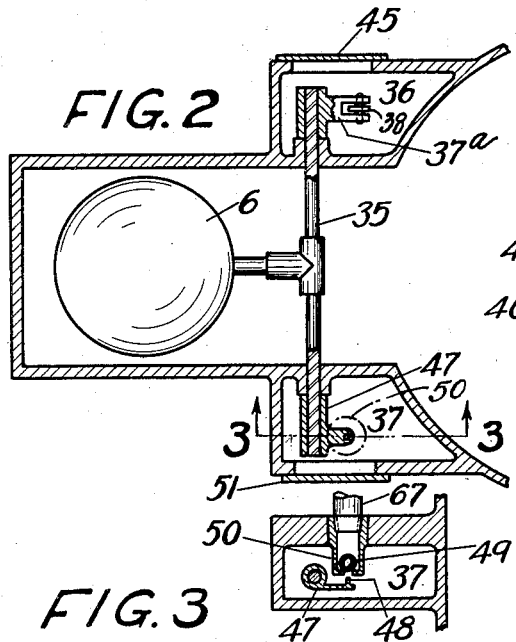
FIG. 2
FIG. 3
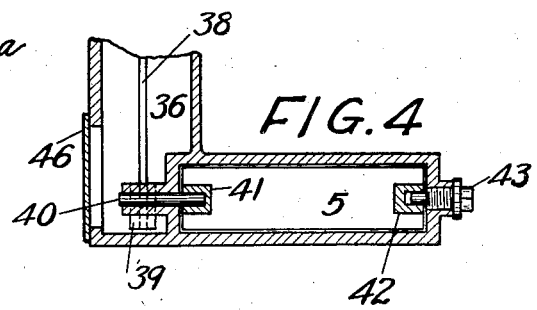
FIG. 4
Inventor
Frans H. C. Coppus
By Attorneys
Southgate Fay & Hawley July 30, 1935.  F. H. C. COPPUS  2,009,577
FEED WATER HEATING SYSTEM
Filed Dec. 11, 1930  4 Sheets-Sheet 3

Inventor
Frans H. C. Coppus
By Attorneys
Southgate Fay & Hackley

July 30, 1935.   F. H. C. COPPUS   2,009,577
FEED WATER HEATING SYSTEM
Filed Dec. 11, 1930   4 Sheets-Sheet 4

Patented July 30, 1935

2,009,577

UNITED STATES PATENT OFFICE 2,009,577

FEED WATER HEATING SYSTEM

Frans H. C. Coppus, Worcester, Mass., assignor to Anna M. C. Wechsberg, Vera L. Wood, and Frans H. C. Coppus, trustees Application December 11, 1930, Serial No. 501,618

20 Claims. (Cl. 122—442)

This invention relates to apparatus for use in connection with a feed water heating system for boilers. It is particularly designed for locomotives but is capable of general use as well.

It is the object of the invention to provide an improved feed water heating system combining all the advantages of the closed, the open and the exhaust steam injector type. In a closed feed water heating system in locomotive practice, the feed pump receives cold water from the tender and pumps it through a tubular heater into the boiler. The water is therefore pumped only once, which is an advantage, but the tubular heater is a source of considerable trouble especially in bad water districts and with it there is no possible way of de-aerating the water. On open feed water heating system, while eliminating the tubular heater, and being capable of eliminating the dissolved oxygen from the feed water, requires two pumping means, one to pump the cold water from the tender into a heating tank where it is heated by direct contact with the exhaust steam from the engine, and the other to pump the hot water out of the heating tank into the boiler. The exhaust steam injector type of feed water heating system needs no tubular heater and the water is handled only once but, like the closed heater, lacks de-aerating means and in practice requires a considerable amount of live steam to discharge the water against boiler pressure, thereby losing greatly in efficiency. The general purpose of this invention, therefore, is to provide a feed water heating system which does not require a tubular heater, which has de-aerating means, which requires only one pumping of the water and which makes use of the principle of injector action without requiring live steam outside of the small amount used for operating the feed pump and yet heats the water to a maximum degree by exhaust steam.

Besides the general purpose of this invention it has several other objects:

When a locomotive is in operation there is usually an abundant supply of exhaust steam to heat the water, but when the locomotive throttle is closed and the locomotive is therefore drifting or standing there is no exhaust steam available, and in order to avoid the objectionable practice of pumping cold water into the boiler I provide a live steam supply to the heater so that hot feed water is at all times available. The live steam supply may be cut in manually or by means of a thermostatic valve which is opened when the temperature of the water in the discharge line or in the pump falls below a predetermined degree.

When the pump is not feeding the boiler, admission of exhaust steam to the heater is not only unnecessary but undesirable, inasmuch as it would only over heat the water and might make the pump steam bound. I therefore provide a valve in the exhaust steam supply to the heater which is only open when the discharge pressure is slightly in excess of the boiler pressure and which closes when the discharge pressure falls below the boiler pressure. This has the further advantage that, if the pump should become steam bound for any reason whatsoever, immediately resulting in drop in discharge pressure, no more steam is admitted to the heating system while the cold water entering the system will quickly render the pump again operative. This valve also eliminates a check valve in the exhaust steam line which is otherwise necessary but very difficult to maintain as will be explained later.

A further object of the invention is to provide a spill valve which may be opened manually but is closed by the pressure of the discharge when this reaches a predetermined figure. This valve may be used to facilitate the starting of the pump if the water in the pump should be very hot, or for draining the pump without the engine man having to leave the cab.

Other objects of the invention will appear hereinafter.

In the preferred form of my invention I use a pumping device with certain features to heat the water to a maximum degree and to render the device capable of functioning as a complete feed water heating system, combining all the advantages of different types of feed water heating systems and eliminating their disadvantages.

Reference is to be had to the accompanying drawings in which

Fig. 1 is a central vertical sectional view of a preferred form of the feed water heater and pump;

Fig. 2 is a sectional view on the line 2—2 of Fig. 1;

Fig. 3 is a sectional view on the line 3—3 of Fig. 2;

Fig. 4 is a sectional view on the line 4—4 of Fig. 1;

Figure 5:
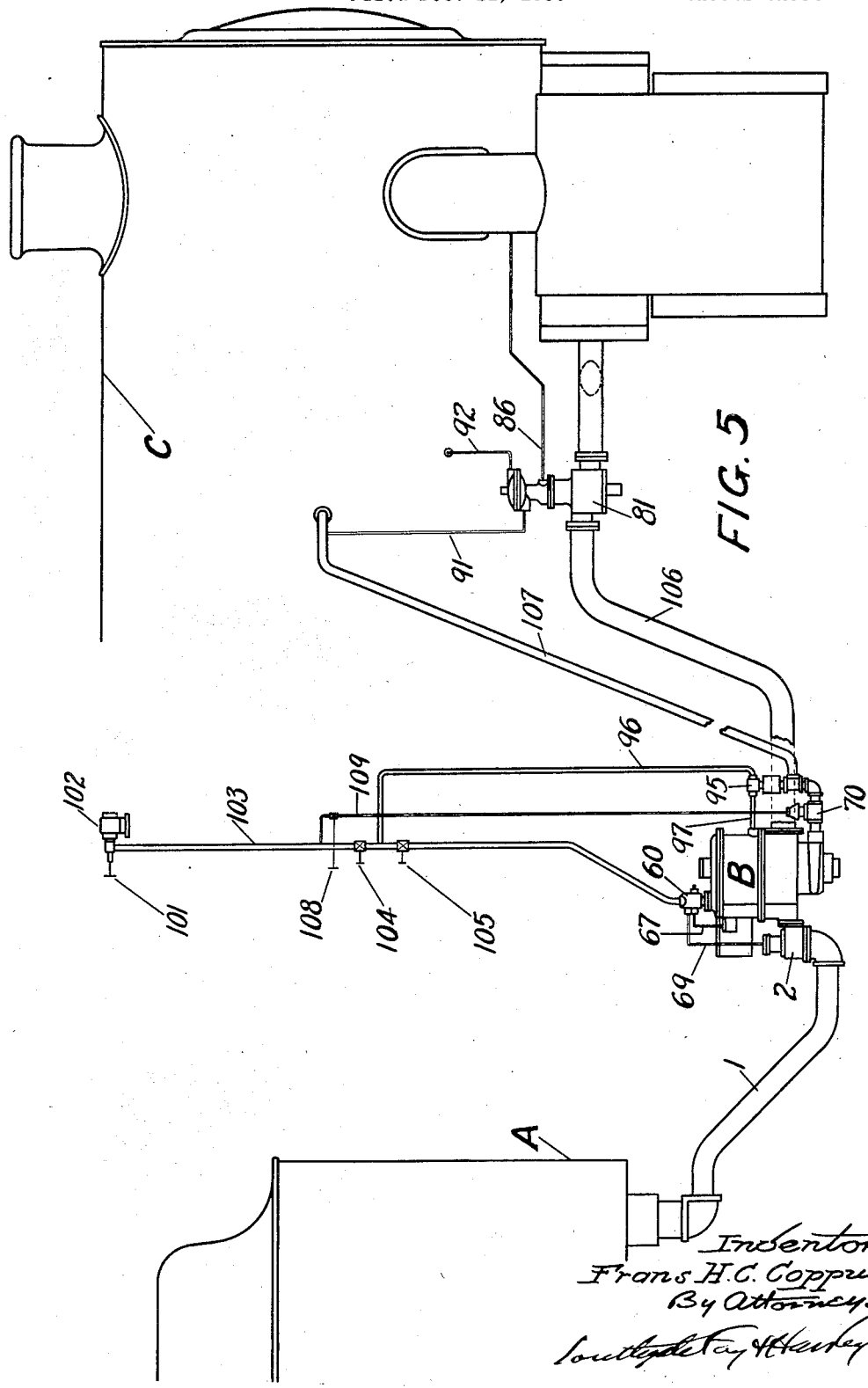
Fig. 5 is a diagrammatic side view showing an application of my invention to a locomotive.

The complete feed water heating plant comprises a storage tank A (Fig. 5) for cold water which, when the system is used in connection with locomotives, represents the tender tank, and a pump B for receiving water therefrom, provided with means for heating it and pumping it into the boiler C.

The tank A feeds through a pipe 1 and a stop valve 2 (Fig. 1) which is either fully open or closed, into the water receiving chamber 3 of the pump B. The inlet 4 thereof is provided with a butterfly valve 5 controlled by a float 6 which keeps the water in the pump at a predetermined height. The water chamber 3 is an annular chamber concentric with the shaft 7 of the pump and in the main preferably of rectangular form in radial cross section, but on the opposite side of its inlet it is reduced in size to provide for the inlet 8 of the annular exhaust steam chamber 9 which is also concentric with the shaft of the pump. Through an annular passage 10 from the water receiving chamber 3 and a conical annular passage 11, from the exhaust steam chamber 9, water and exhaust steam are discharged into an annular conical combining nozzle 12, whereby the steam is condensed and the water heated.

The pump casing is made in two sections B¹ and B² and a cover 28. The lower section B¹ of the pump and heater casing contains, besides the water and the exhaust steam receiving chambers, a suction inlet 13 to a pump impeller 14 and a pump volute and discharge 15. To the latter is connected a lower bearing housing 16. The water passage 10 is formed by annular members 17 and 18 and the exhaust steam passage 11 by members 17 and 19, all of which members may be bolted or otherwise held in place in fixed relationship to the pump and heater casing or adjustably. Annular members 20 and 21 serve as a continuation of the member 18 guiding the heated water inwardly and forming together an annular passage or nozzle 22 leading from the live steam chamber 23 which is an annular chamber in the upper section B² of the pump and heater casing and receives live steam through a pipe 97.

Section B² has a partition 25 with a downward tubular extension 26 at the lower end of which are outwardly inclined nozzles 27 which may be of any desired construction such as drilled holes, radial slots, etc. The partition 25 forms with the turbine cover 28, which contains the steam chamber 29 and one or more nozzles 30, the turbine chamber 31 in which the turbine 32 is located fastened to the shaft 7. The exhaust steam of the turbine chamber is discharged through the downward extension and the nozzles 27 into the water in the pump and heater casing. The chamber 29 receives live steam from a pipe 103 as will be explained.

Section B² has a float chamber 115 to one side of it, in open communication and preferably integral therewith in which the float 6 is located out of the way of the incoming water and therefore undisturbed by it. A cover 33 gives access to the float. In one of the walls of the float chamber is a vent 34. A large percentage of the oxygen entering with the feed water may be eliminated through it. On the other hand the temperature to which the water may be heated depends largely upon the size of this vent. With an abundant supply of exhaust steam the water may not only be brought to the boiling point but back pressure may be created in the heater, in which case exhaust steam will be discharged through the vent. Again, the vent may be provided with a spring loaded valve leaving only a very small hole for natural venting and allowing back pressure to be built up to the pressure at which the valve is set.

The float is connected to a shaft 35 (Fig. 2) extending through to the walls of the float chamber into water pockets 36 and 37 adjacent to the opposite sides of the float chamber. The pocket 36 extends all the way downward to the bottom of the water receiving chamber 3 and is drained thereto. An arm 37ª fastened to the shaft 35 connects through a link 38 to an arm 39 fastened to a shaft 40 which is pressed in or pinned to the hub 41 of the butterfly valve 5 (Fig. 4). The hub 42 on the opposite side of the butterfly valve fits movably over a trunnion pin 43. Covers 45 and 46 give access to arms and lever connections. The pocket 37 extends only a little way downward and is drained into section B². In this pocket is located an arm 47 (Figs. 2 and 3) fastened to the shaft 35 and provided with an upward extension 48 to engage with the ball 49 of the ball check 50. A cover 51 gives access to the pocket.

The stop valve 2 has a disc 52 and a seat 53. The disc stem 54 has a seated plunger 55 operating in a cylinder 56. A spring 57 keeps the valve closed unless steam is supplied to the cylinder 56 through a pipe 69 extending through the cover 58.

Figure 6:
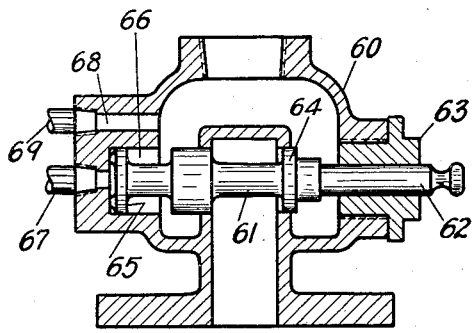
Fig. 6 is an enlarged central vertical sectional view of the trip valve shown in Fig. 5.

Live steam to operate the pump is supplied through a trip valve 60 (Fig. 5). This valve has a member 61 (Fig. 6) having a stem 62 which passes through a plug 63. The valve 64 is normally pulled away from its seat by the action of the steam, which will be explained later.

At the other end of the member 61 is a plunger 65 which fits loosely in a recess 66. This recess is directly connected with a pipe 67 (Fig. 5) to the ball check valve 50 (Fig. 3). The relationship here is such that steam can leak by the plunger 65 into the pipe 67 and the check valve 50 so that while things are operating normally there is steam pressure in the pipe 67 ready to escape by the ball 49 if this should be lifted off its seat. When the steam does escape there the pressure behind the plunger 65 is released and the steam pressure beyond this plunger will force it back in the recess 66 and close the valve 64. This shuts off the supply of steam to the pump. When the ball is allowed to seat again the steam pressure gradually builds up in the pipe 67 until it is approximately the same on both sides of the plunger. However, the effective area of this plunger is less on the inner side than the outer side because an area equal to the cross section of the stem 62 is exposed to the atmospheric pressure only. Therefore, the plunger will move outward and open the valve 64.

When there is a supply of water in the pump and heater casing to raise the float sufficiently to keep the projection 48 on the arm 47 (Fig. 3) away from the ball 49, steam will then be supplied to operate the pump, but when there is no water in the pump the pump cannot start, and if the water falls below a predetermined height the pump will stop for lack of steam to operate it.

The valve 60 has a port 68 communicating with the steam supply to the valve and through a pipe 69 to the cylinder 56 of valve 2. Thus, as long as there is steam supply to the valve 60 the valve 2 will be open, but when the steam is shut off valve 60, pressure in the cylinder 56 will disappear and the spring 57 will bring the disc 52 of the valve 2 to its seat thereby preventing any further water from entering the water receiving chamber 3.

Figure 7:
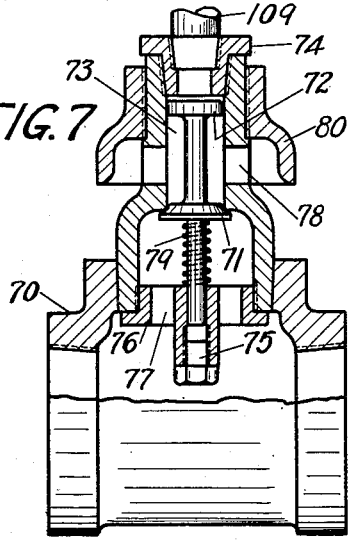
Fig. 7 is an enlarged central vertical sectional view of the spill valve shown in Fig. 5.

The spill valve 70 (Fig. 5) is placed in the discharge line of the pump. This valve (Fig. 7) has a spring loaded valve disc 71 provided on its upper end with a plunger 72 in a cylinder 73. The top of the cylinder is provided with a plug 74 through which steam from the boiler is supplied through a pipe 109. The steam pressure opens the valve as far as the screw 75 allows it to go. The member 76 has openings 77 through which water from the discharge line passes by the valve disc 71 and through openings 78 outward until the pressure in the discharge line against the valve disc 71 with the help of the spring 79, is sufficient to close the valve against the steam pressure on top of the plunger. A bonnet 80 on the outside of the cylinder 73 directs the discharged water downward.

Figure 8:
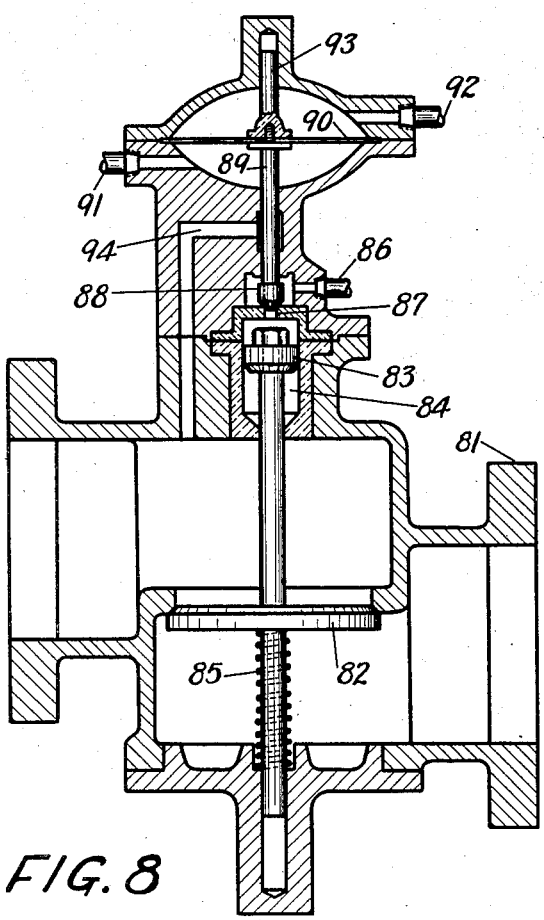
Fig. 8 is an enlarged central vertical sectional view of the exhaust steam admission valve shown in Fig. 5.

In the exhaust steam supply line 106 to the exhaust steam receiving chamber 9 is placed the valve 81 (Fig. 5). This valve has a spring loaded valve disc 82 (Fig. 8), the stem of which carries at its upper end a plunger 83 operating in a cylinder 84. When there is steam pressure on top of the plunger the valve is fully open, and when there is no steam pressure there then the valve is held against its seat by the spring 85.

Steam is supplied by a line 86 from the steam chest of the engine through an opening 87 in the top of the cylinder 84. This opening may be closed by a valve 88 which is operated by a stem 89 connected to a diaphragm 90, the lower side of which is connected by a pipe 91 from the discharge line and the upper side by a pipe 92 from the boiler. The effective area at the bottom of the diaphragm is slightly less than that on the top of the diaphragm because, while the full area on top of the diaphragm, including the cross section of the stem 93, is exposed to the boiler pressure, the area of the stem 89 at the bottom of the diaphragm is only partly exposed to the boiler pressure as the area equal to that of the opening 87 when the valve 88 is seated is not exposed to pressure. It will therefore be seen that when there is no discharge pressure against the bottom of the diaphragm, the valve 88 will be closed shutting off steam from the top of the plunger 83 thereby keeping the valve 82 closed. If, however, water is delivered into the boiler, at which time the discharge pressure is slightly higher than the boiler pressure, the valve 88 is lifted off its seat and steam is supplied to the top of the plunger 83 thereby opening the valve 82. Again, when the engine is standing, no steam supply is available to be admitted to the top of the plunger 83 and the valve 82 will be closed even if the pump should discharge water into the boiler. When the engine is drifting and there is only very little pressure in the steam chest this pressure will not be sufficient to open the valve 82 against the action of the spring 85 even if the pump should be delivering water to the boiler and the valve 88 is off its seat, thereby preventing water being drawn from the pump into the cylinders of the engine through the exhaust steam supply line to the heater. Any leakage by the stem 89, either water from below the diaphragm 90 or steam from the pipe 86, is discharged through the passage 94 to the delivery side of the valve.

The valve 81 takes the place of a check valve which is invariably placed in the exhaust line to a heater to prevent water from backing up into the cylinder of the engine and in connection with a locomotive also to prevent water from being drawn into the cylinders of the engine when the engine is drifting. As the check valve is opened and closed, with each stroke of the piston an ordinary check valve would not last any length of time and therefore a special check valve is usually provided consisting of a large number of small valves which, while withstanding better the effect of constant opening and closing, need, of course, much care and attention.

Figure 9:
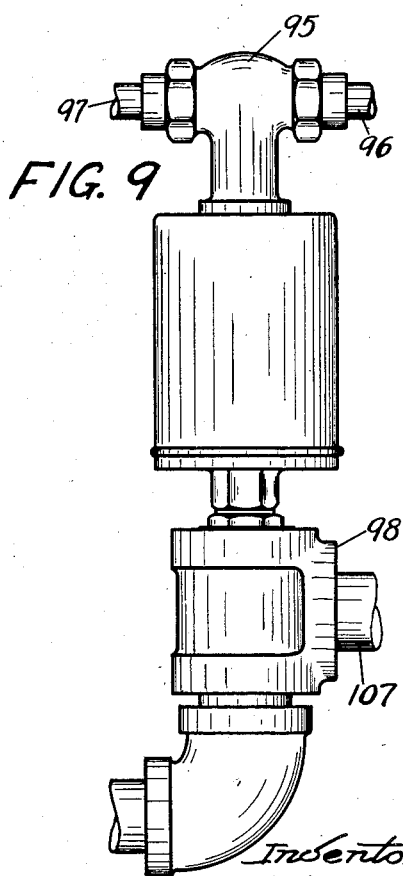
Fig. 9 is an enlarged side view of the thermostatically controlled live steam admission valve and connections shown in Fig. 5.

To the discharge line of the pump is connected a thermostatic valve 95 (Fig. 5) which receives live steam through the line 96 and delivers it through the line 97 to the live steam chamber 23 of the pump and heater casing. The valve is connected to the top of the T 98 (Fig. 9), the thermostatic bulb extending into the T. This valve is of standard construction and the valve remains closed until the temperature of the water falls below a predetermined degree. The valve, therefore, is not intended to keep the water at a constant temperature, but merely to supply live steam to the heater if the temperature of the water reaches a predetermined minimum which would be the case when the pump is being operated while the engine is standing or drifting, or the exhaust steam supply should not be sufficient at any time to heat the water to a point considered desirable in order not to injure the boiler by supplying it with water of insufficient temperature.

Figure 10:
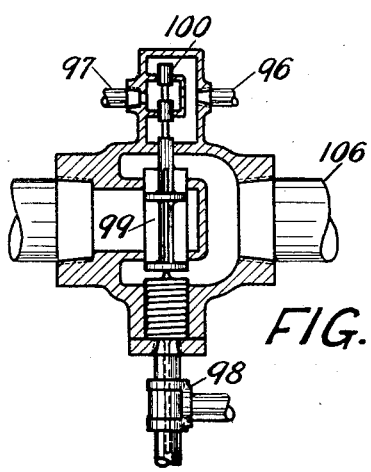
Fig. 10 is a central vertical sectional view of a modification of the valve shown in Fig. 9.

Instead of merely providing for a minimum temperature, the valve shown in Fig. 10 may be used. This valve is placed in the exhaust steam supply line and the thermostatic bulb is connected to the T 98 in the discharge line. With this valve the temperature of the water can be kept, at all times, at a predetermined degree. It has two double seated valves, one of which 99, controls the admission of exhaust steam and the other, 100 controls the admission of live steam. These valves are shown in a position where the exhaust steam is almost shut off on account of the water having reached the maximum temperature. If this valve is fully open and the desired temperature of the water is not reached, the live steam valve 100 begins to open.

Operation

Referring to Fig. 5. When first starting the pump the valve in the tender is opened. This admits water to the valve 2, Fig. 1, which is closed. By opening the steam valve 101 steam is admitted from the turret 102 to the steam line 103. By opening valve 104 fully, steam is admitted to the valve 60 through valve 105 which may be, and preferably is, so arranged that when closed it passes enough steam for the predetermined minimum of delivery of the pump. This may be readily accomplished by drilling a hole of sufficient size in the valve disc of any standard valve. As soon as steam is supplied to the valve 60 steam flows through the pipe 69 into the cylinder 56 of valve 2 and opens the valve fully, thereby allowing cold water to enter into the pump and heater casing by the butterfly valve 5. Live steam will be admitted through the line 96, the thermostatic valve 95, and the line 97, to the live steam chamber 23 of the pump and heater casing. As soon as there is sufficient water in the pump and heater casing to raise the float 6 the ball 49 (Fig. 3) seats thereby permitting opening of the trip valve 60 and supplying steam to the turbine, the exhaust of which will be discharged through the nozzles 27 of the downward extension 26 into the water.

As soon as the pressure in the discharge line is sufficient to deliver water to the boiler, valve 81 in the exhaust steam supply line 106 will open and the exhaust steam will enter the exhaust steam receiving chamber 9 and will discharge through the passage 11, thereby heating the water entering through the passage 10. When the temperature of the water in the discharge line 107 reaches a predetermined degree of the thermostatic valve 95 will close. To regulate the capacity of the pump the valve 105 is more or less opened. To stop the pump all that is necessary is to close valve 104. Valve 2 will close immediately and no more water will be delivered to the pump. The steam supply being shut off, the pump will stop, the discharge pressure immediately disappears, thereby closing valve 81 so that no more exhaust steam will be admitted to the pump.

To re-start the pump valve 104 is again fully opened, opening immediately the valve 2, but as there is now sufficient water in the pump, no, or very little, water passes by the butterfly valve 5 and as the ball 49 is on its seat valve 60 will open instantly starting the pump. If the water in the pump should be too hot for the pump to handle, valve 108 in the line 109, which preferably is a spring loaded valve normally closed but held open by pressing down on a lever, such as a whistle valve, should be opened whereupon the valve 70 in the discharge line will open and water will be discharged through same, thereby lowering the water level in the pump and heater casing and allowing cold water to take its place. This reduces the temperature of the water, and the impeller will handle the water and the discharge pressure in the discharge line will close valve 70 whether valve 108 is held open or not.

The exhaust steam supply line 106 receives steam from the exhaust cavities of the locomotive cylinders.

In the preferred form of my invention just described, the water from the cold water tank flows by gravity to the pump which flow may be slightly augmented by injector action caused by the condensation of the exhaust steam by the water, the two elements having injector-like or directional relationship. The water chamber being vented to the atmosphere and the height of the water controlled by a float, no pressure can be created in the pump casing by injector action, but if there is back pressure in the pump casing, due to the water not condensing all the exhaust steam, the injector action is sufficient to overcome this back pressure so that the water will not be held back.

In the modification shown in Figs. 11 to 14 inclusive full injector action is established. That is to say, the water is delivered to the impeller under considerable pressure which has the advantage that the pump is relieved of considerable of its work to pump the water into the boiler, but it has the disadvantage that there are no means for eliminating the oxygen from the water and also that the water may not be heated to as high a degree.

Figure 11:
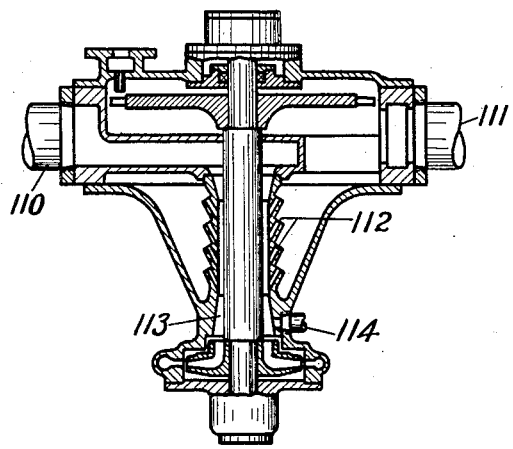
Fig. 11 is a central vertical sectional view of a modification of the heater and pump embodying a particular form of an injector design.

In Fig. 11 the water enters at 110 and flows by the shaft directly to the pump impeller. Exhaust steam from the engine enters at 111 and with the exhaust of the turbine enters through nozzles 112 around the inflowing water, is condensed by it and the heated water is discharged in the combining nozzle 113. This nozzle has an outlet which is connected by a pipe 114 to the usual overflow valve which is a standard feature of all injectors.

Figure 12:
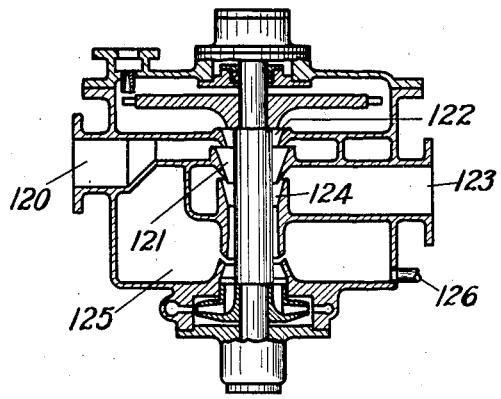
Fig. 12 is a similar view of another modification showing another form of injector design.

In Fig. 12 the water enters at 120 and flows through the nozzle 121 by the shaft to the impeller. The exhaust steam of the turbine enters through the nozzle 122 and the exhaust steam of the engine enters at 123 into the nozzle 124. In this case the water chamber 125 surrounds the nozzle elements and from the water chamber the pipe 126 leads again to the overflow valve.

Figure 13:
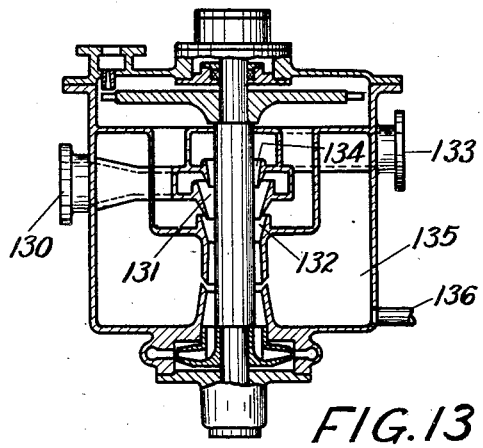
Fig. 13 is a similar view showing slightly different modifications from that shown in Fig. 12.

In Fig. 13 the water enters at 130 and flows through the nozzle 131 by the shaft to the impeller. The exhaust steam of the turbine enters through the nozzle 132 and the exhaust steam of the engine enters at 133 into the nozzle 134. Again, a water chamber 135 surrounds the nozzle elements and again a pipe 136 leads to the overflow nozzle.

Figure 14:
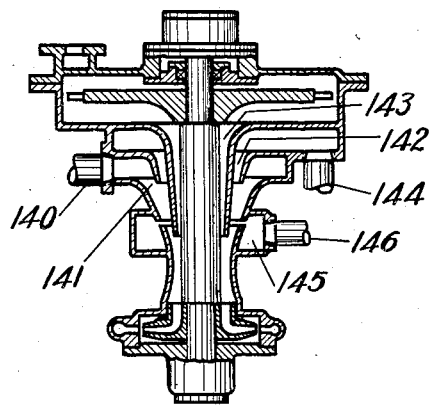
Fig. 14 is a similar view showing still another modification.

In Fig. 14 the water enters at 140 and flows through nozzle 141 but in this case not directly by the shaft but around nozzle 142 through which the exhaust steam of the engine enters and beyond around nozzle 143 through which the exhaust steam of the turbine enters. The exhaust steam of the engine enters at 144. A chamber 145 surrounds the nozzle elements and to this chamber again is connected a pipe 146 leading to the overflow valve.

Although I have illustrated and described only a few forms of the invention I am aware of the fact that other modifications can be made therein by any person skilled in the art without departing from the scope of the invention as expressed in the claims. Therefore I do not wish to be limited in this respect but what I do claim is:—

1. In a locomotive feed water heating system, the combination with a pump having a water receiving chamber, and means for directing exhaust steam into said chamber to heat the water, of a valve in the exhaust steam supply, a cylinder and plunger, the plunger being connected with the valve, a spring acting to close the valve in opposition to the plunger, a steam supply to the cylinder from the steam chest of the engine for opening the valve, and means for closing the steam supply to said cylinder when the boiler pressure is higher than the discharge pressure of the pump.

2. In a locomotive feed water heating system, the combination with the locomotive boiler, a pump having a water receiving chamber, and means for directing exhaust steam into said chamber to heat the water, of a valve in the exhaust steam supply, a cylinder and plunger, the plunger being connected with the valve, a spring acting to close the valve in opposition to the plunger, a steam supply to the cylinder from the steam chest of the engine for opening the valve, a diaphragm, means for connecting one side of the diaphragm to the discharge of the pump and the other side to the boiler, a valve for closing the steam supply to said cylinder, and a connection between said valve and the diaphragm, whereby the valve closes when the boiler pressure exceeds the pump discharge pressure.

3. In a locomotive feed water heating system, the combination with a pump having a water receiving chamber, and means for directing exhaust steam into said chamber to heat the water, of means for opening the exhaust steam supply controlled by the discharge pressure of the pump and the steam pressure in the steam chest of the locomotive engine.

4. In a locomotive feed water heating system, the combination with a feed water pump, a feed water heater, an exhaust steam supply for heating the water, and a discharge pipe from the pump to the boiler, of a spring-closed valve in the exhaust steam supply, said valve having a stem provided with a plunger, a cylinder in which the plunger is located, means for introducing steam into said cylinder from the steam supply to the locomotive engine to move the stem and open the valve, said means comprising a chamber having a port and a valve for closing and opening the port, a diaphragm with which said valve is connected, means for introducing steam pressure from the boiler on one side of the diaphragm, and means for introducing pressure from the discharge side of the pump on the other side.

5. In a feed water heating apparatus, the combination with a pump having a water receiving chamber, a turbine adapted to be operated by steam, and an impeller operated directly by the turbine for discharging the heated water, of annular means for receiving exhaust steam, annular means surrounding the first named annular means for receiving the cold water, means for directing the cold water further into said chamber in a thin annular stream, and means for injecting the exhaust steam conically into said stream in the direction in which said stream is flowing.

6. In a locomotive feed water heater, the combination of a centrifugal pump having a water receiving chamber, means for introducing exhaust steam and directing it through a narrow channel into the incoming cold water, means for introducing live steam and injecting it into the water in the receiving chamber, and automatic means for introducing the live steam when the temperature of the water falls below a predetermined degree.

7. In a pump, the combination of a casing to receive water to be heated, a turbine chamber at the top of the casing having a hollow tubular extension projecting downwardly below the water level, a turbine in the chamber, a turbine shaft extending down through said tubular extension to the bottom of the pump, an impeller on the shaft, said tubular extension having openings near the bottom through which the exhaust steam from the turbine is injected into the water in the casing to heat it, an annular chamber near the bottom of the pump into which cold water is fed and having a narrow annular outlet passage above it, an annular chamber inside the first named annular chamber into which exhaust steam is delivered, a conical outlet from the last named annular chamber, means for directing the steam entering from said outlet into the flowing stream of water just above the second annular chamber, and means for causing the water and steam to flow in a conical stream together, whereby the steam is injected into the water.

8. In a pump, the combination of a casing to receive water to be heated, a turbine above the casing, a turbine shaft, an impeller on the shaft below the casing, an annular chamber near the bottom of the casing into which cold water is fed and having a narrow annular outlet passage above it, an annular chamber at the bottom of the casing into which exhaust steam is delivered, a conical outlet from the last named annular chamber, means for directing the steam entering from said outlet into the flowing stream of water just above the second annular chamber, means for causing the water and steam to flow outwardly in a conical stream together, whereby the steam is injected into the water, the walls of the pump casing extending inwardly thereabove to direct the heated water inwardly, an annular passage above said chambers connected with a source of live steam at certain times, a conical discharge from the annular passage extending downwardly into the stream of water in the casing.

9. The combination of a pump having a casing to receive the water and means for heating the water therein, of a spill valve connected with the pump at its discharge, said valve being normally closed when the pump is idle but adapted to be opened when it is desired to drain off hot water, and means for closing the valve by the pressure of the water in the discharge when it reaches a predetermined amount, whereby the valve facilitates starting the pump if the water in the pump is very hot.

10. In a locomotive feed water heating system, a live steam supply to operate the engine, a water supply, an exhaust steam supply from the engine to heat the water, and a valve in the exhaust steam supply, said valve being held open automatically only as long as the system is feeding the boiler and the steam supply to the engine is of a predetermined pressure.

11. In a locomotive feed water heating system, a live steam supply to operate the engine, a water supply and an exhaust steam supply from the engine to heat the water, a valve in the exhaust steam supply, said valve being opened automatically as soon as the system begins to feed water to the boiler, providing the live steam supply to the engine is of a predetermined pressure.

12. In a feed water heating apparatus, a pump having a water receiving chamber, a float in the upper part thereof, means associated with the float to keep the water in said chamber at a certain height, a turbine to drive the pump, a steam supply for the turbine, a valve in said steam supply, and means associated with the float to close said valve when the float drops below a predetermined point.

13. In a feed water heating system, the combination with a boiler, a feed pump and means for supplying water to the suction side of the pump, of means for directing steam into said water supply when the pump is feeding water into the boiler and means responsive to the difference between the steam pressure of the boiler and the discharge pressure of the pump for automatically shutting off said steam supply when the excess discharge pressure of the pump falls below a predetermined amount.

14. In a feed water heating system, the combination with a pump, of a spill valve for permitting draining of water from the pump, means normally holding said valve closed whether the pump is idle or operating, and a piston adapted to be acted upon by fluid pressure for opening said valve when the pump is idle.

15. In a feed water heating system, the combination with a pump, of a spill valve for permitting draining of water from the pump, means normally holding said valve closed, and a piston adapted to be acted upon by fluid pressure for opening said valve when the pump is idle, said valve being closed, counteracting said fluid pressure, by the discharge pressure of the pump when the pump is put in operation.

16. In a feed water heating apparatus, the combination with a pump having a water receiving chamber, a turbine adapted to be operated by steam, and an impeller operated by the turbine for discharging the heated water, of annular means for receiving exhaust steam, annular means in axial alignment with the first named annular means for receiving the cold water, means for directing the water further into said chamber in an annular stream, and means for injecting the exhaust steam into said stream in the direction in which said stream is flowing.

17. In a pump having a casing to receive the water, a turbine above the casing, a turbine shaft, an impeller on the shaft below the casing, a chamber near the bottom of the casing into which cold water is fed and having an annular outlet passage above it, a chamber at the bottom of the casing into which exhaust steam is delivered and having an annular outlet passage above it, and a combining chamber receiving the water from the annular outlet of the first named chamber and the exhaust steam from the annular outlet of the last named chamber and delivering the water heated by the exhaust steam to the pump casing.

18. In a pump having a casing to receive the water, a turbine above the casing, a turbine shaft, an impeller on the shaft below the casing, a chamber near the bottom of the casing into which cold water is fed and having an annular outlet passage above it, a chamber at the bottom of the casing into which exhaust steam is delivered and having an annular outlet passage above it, a combining chamber receiving the water from the annular outlet of the first named chamber and the exhaust steam from the annular outlet of the last named chamber and delivering the water heated by the exhaust steam to the pump casing, an annular passage above said combining chamber connected with a source of live steam at certain times, and means to discharge live steam from said annular passage into the water in the pump casing.

19. In a feed water heating apparatus, the combination with a pump having a water inlet casing, of means for feeding the cold water into the casing, a chamber near the top of the casing provided with a vent to the atmosphere for de-aerating the water, means for introducing exhaust steam into the pump casing, means for injecting the exhaust steam into the entering stream of cold water, and means responsive to the water level in said chamber for controlling the supply of steam for operating the pump and means operatively connected to the last named means for controlling the supply of water to the pump.

20. In a locomotive feed water heating system, a water supply and an exhaust steam supply to heat the water, a pump to feed the boiler, a valve in the exhaust steam supply, and means responsive to the difference between the steam pressure of the boiler and the discharge pressure of the pump for keeping said valve open or closed.

FRANS H. C. COPPUS.